(12) United States Patent
Makita

(10) Patent No.: US 8,888,630 B2
(45) Date of Patent: Nov. 18, 2014

(54) OIL PUMP DRIVING MECHANISM

(75) Inventor: Kenichi Makita, Sagamihara (JP)

(73) Assignees: JATCO Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 691 days.

(21) Appl. No.: 12/124,295

(22) Filed: May 21, 2008

(65) Prior Publication Data

US 2008/0293530 A1    Nov. 27, 2008

(30) Foreign Application Priority Data

May 22, 2007    (JP) .................. 2007-135530

(51) Int. Cl.
*F16H 55/30*    (2006.01)
*F16H 7/00*    (2006.01)
*F16H 55/00*    (2006.01)

(52) U.S. Cl.
USPC ................ 474/152; 474/48; 474/148

(58) Field of Classification Search
USPC ............................. 474/18, 148, 152
See application file for complete search history.

(56) References Cited

U.S. PATENT DOCUMENTS

| | | | | |
|---|---|---|---|---|
| 1,709,527 A | * | 4/1929 | Ford ................................... | 188/20 |
| 2,348,717 A | * | 5/1944 | Banker ....................... | 192/69.83 |
| 2,966,244 A | * | 12/1960 | Schreyer ....................... | 477/197 |
| 4,018,062 A | | 4/1977 | Bulliot | |
| 4,205,807 A | * | 6/1980 | Shimogawa et al. ......... | 242/372 |
| 4,309,001 A | * | 1/1982 | Ahad .......................... | 242/382.1 |
| 4,467,896 A | * | 8/1984 | Sauerwein et al. ............. | 188/69 |
| 4,469,308 A | * | 9/1984 | Nakamura et al. ............. | 254/350 |
| 4,604,098 A | * | 8/1986 | Seamone et al. ................. | 623/60 |
| 4,768,754 A | * | 9/1988 | Nishimura ..................... | 254/351 |
| 4,887,775 A | * | 12/1989 | Kanaguchi et al. ........... | 242/349 |
| 5,251,842 A | * | 10/1993 | Zygutis et al. ................ | 242/372 |
| 5,551,523 A | * | 9/1996 | Berg et al. ...................... | 180/273 |
| 5,638,970 A | * | 6/1997 | Garby et al. ................... | 215/219 |
| 5,799,756 A | * | 9/1998 | Roberts et al. ................. | 188/2 F |
| 6,044,724 A | * | 4/2000 | Timms .......................... | 74/411.5 |
| 6,250,433 B1 | * | 6/2001 | Sealine et al. ................... | 188/69 |
| 6,286,633 B1 | * | 9/2001 | Kim ................................. | 188/69 |
| 6,308,804 B1 | * | 10/2001 | Roberts .......................... | 188/2 F |
| 6,481,556 B1 | * | 11/2002 | Haupt .......................... | 192/219.5 |
| 6,513,638 B2 | * | 2/2003 | Thyselius .................. | 192/219.5 |
| 6,969,023 B2 | * | 11/2005 | Weller ........................ | 242/383.2 |
| 7,175,002 B2 | * | 2/2007 | Chiang ......................... | 188/1.12 |
| 2005/0255954 A1 | * | 11/2005 | Ishikawa et al. .............. | 474/152 |
| 2008/0169168 A1 | * | 7/2008 | Nishimura .................. | 192/219.5 |

FOREIGN PATENT DOCUMENTS

| | | |
|---|---|---|
| JP | 51-8436 A | 1/1976 |
| JP | 2003-156130 A | 5/2003 |
| JP | 2005-325979 A | 11/2005 |
| JP | 2006-64009 A | 3/2006 |

* cited by examiner

*Primary Examiner* — Michael Mansen
*Assistant Examiner* — Henry Liu
(74) *Attorney, Agent, or Firm* — Foley & Lardner LLP

(57) ABSTRACT

When an engaging pawl 23*b* is fitted into a recessed portion 34*b* of a first sprocket 34, which is linked by a chain 33 to a second sprocket 32 that drives an oil pump 3 disposed at a radial detached from a torque converter 2, frictional resistance between a side face 34*a* of the first sprocket 34 and an end face 23*c* of the engaging pawl 23*b* is reduced by tapering the side face 34*a* of the first sprocket 34.

3 Claims, 7 Drawing Sheets

OIL PUMP DRIVING MECHANISM

FIELD OF THE INVENTION

This invention relates to an oil pump driving mechanism.

BACKGROUND OF THE INVENTION

The techniques described in JP2003-156130A and JP2005-325979A are well-known as conventional techniques for driving an oil pump. Specifically, a torque converter sleeve is provided so as to extend axially to an inner diameter side of an impeller shell that is coupled to a converter cover of a torque converter by welding or the like, and an engaging pawl is provided on an end portion of the torque converter sleeve.

The engaging pawl is inserted into an insertion hole provided in a side face of a drive sprocket supported on a transmission main body side, and transmits the driving force of an engine by contacting an inner side wall of the insertion hole.

A chain is looped around the drive sprocket (first sprocket) and a driven sprocket (second sprocket) supported on the oil pump side, and the chain transmits the rotation of the drive sprocket to the driven sprocket, whereby the oil pump is driven.

Typically, the converter cover is caused to expand by an oil temperature increase or oil pressure in the torque converter, and therefore slight axial movement of the torque converter sleeve must be permitted. For this purpose, an outer peripheral surface of the engaging pawl and an inner peripheral surface of the drive sprocket (insertion hole) are engaged to each other so as to be capable of axial movement, thereby permitting slight axial movement. Hence, the outer peripheral surface of the engaging pawl and the inner peripheral surface of the drive sprocket (insertion hole) are engaged to each other so as to be capable of axial movement, and therefore the driving force is transmitted while permitting axial movement.

SUMMARY OF THE INVENTION

Typically, when the torque converter is mounted on the drive sprocket, which is provided on a transmission input shaft, the engaging pawl does not always align with the position of the at least one insertion hole provided in the drive sprocket, and therefore the engaging pawl is inserted into the insertion hole by performing positioning between the engaging pawl and the insertion hole while rotating the torque converter.

When the engaging pawl fails to enter the insertion hole and comes into contact with the side face of the drive sprocket as a result, surface contact with the side face occurs due to the flat shape of the surface on the tip end portion of the engaging pawl, leading to an increase in frictional resistance. Hence, when the drive resistance of the oil pump is small, for example, frictional resistance between the engaging pawl and the side face of the drive sprocket causes the drive sprocket and the engaging pawl to co-rotate, making it impossible to insert the engaging pawl into the insertion hole easily, and as a result, the torque converter itself cannot easily be mounted on the input shaft.

This invention has been invented to solve the problem described above, and it is an object thereof to enable easy mounting when an engaging pawl is mounted in an insertion hole of a drive sprocket.

This present invention provides an oil pump driving mechanism having a linking mechanism that links a first sprocket, which is linked by a chain to a second sprocket that drives an oil pump disposed in a radially removed position from a rotary shaft of a torque converter and rotates about the rotary shaft of the torque converter, and an engaging pawl of the torque converter, wherein the linking mechanism comprises a recessed portion which extends axially from a side face of the first sprocket facing the torque converter and into which the engaging pawl of the torque converter is inserted and a friction reducing mechanism provided on at least one of the side face and the engaging pawl.

According to this invention, by providing the friction reducing mechanism on at least one of the side face of the first sprocket and the engaging pawl of the torque converter, frictional resistance between the engaging pawl and the side face of the first sprocket can be reduced if the engaging pawl comes into contact with the side face of the first sprocket when the engaging pawl is inserted into the recessed portion of the first sprocket while rotating the engaging pawl, for example. As a result, positioning between the engaging pawl and the recessed portion of the first sprocket can be performed easily, and the engaging pawl can be inserted into the recessed portion of the first sprocket easily.

The details as well as other features and advantages of this invention are set forth in the remainder of the specification and are shown in the accompanying drawings.

DETAILED DESCRIPTION OF THE PREFERRED EMBODIMENT

A first embodiment of this invention will now be described.

Figure 1:
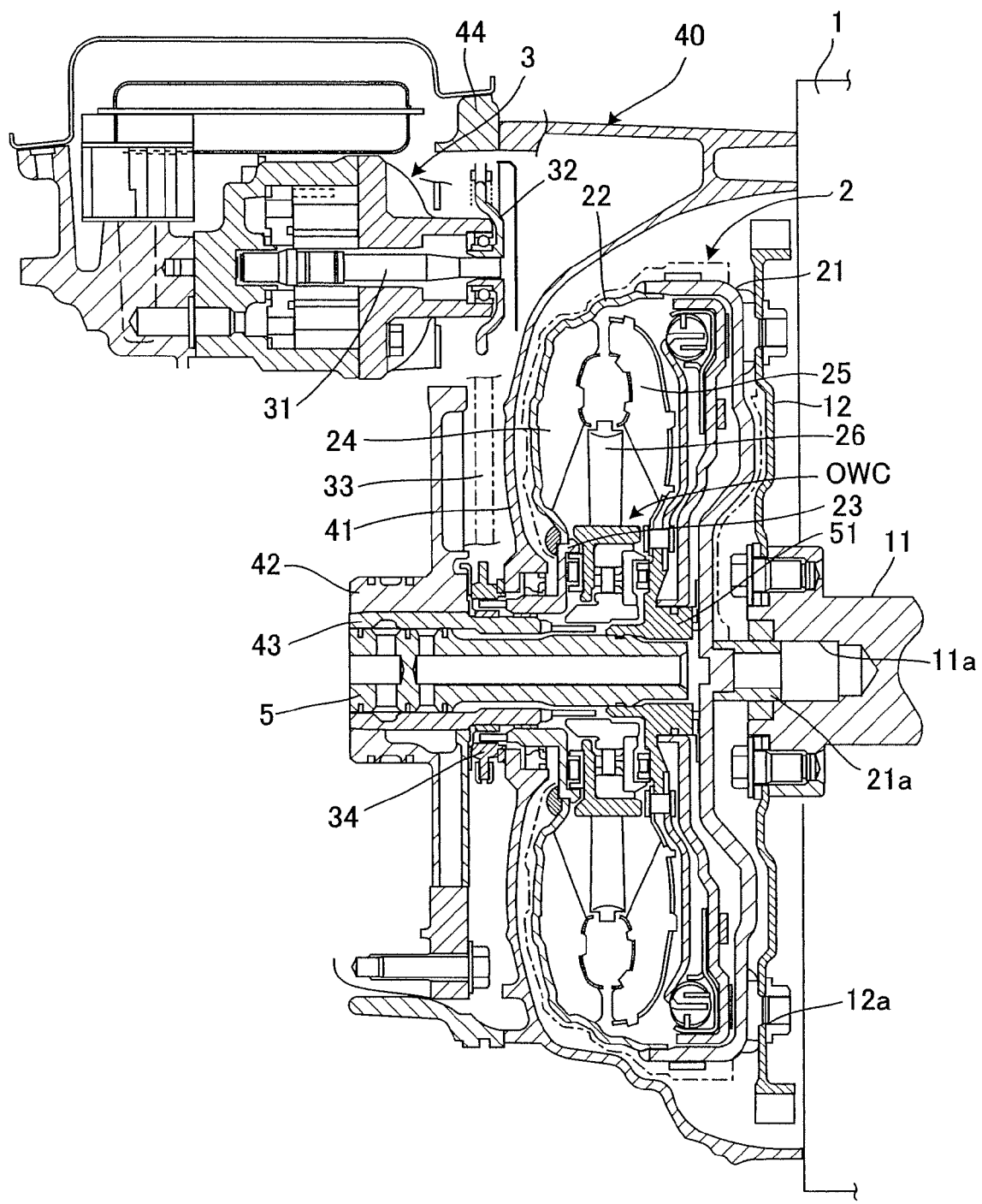
FIG. 1 is a schematic constitutional diagram showing the vicinity of a torque converter for an automatic transmission according to a first embodiment of this invention.

FIG. 1 is a partial cross-sectional view showing the vicinity of a torque converter in an automatic transmission comprising an oil pump driving mechanism. A transmission unit housing 40 attached to an engine 1 is provided with a torque converter housing 41 that houses a torque converter 2, a cover 42 and a stator shaft 43 that rotatably support an input shaft 5, the torque converter 2, and so on, and an oil pump housing 44 that houses an oil pump 3. The cover 42 according to this embodiment is formed from a material such as aluminum to achieve weight reduction, while the stator shaft 43 is formed from an iron-based material to secure enough strength to function as a support. The oil pump 3 according to this embodiment is disposed in a radially detached position from the input shaft 5.

An engine drive plate 12 is connected to a crankshaft 11 that outputs a driving force of the engine 1 by a bolt. A linking portion 12a is provided on a radial outer side of the engine drive plate 12 and connected to a converter cover 21 of the torque converter 2. A pilot boss 21a is provided in an engine 1 side axial center portion of the converter cover 21, and the torque converter 2 is centered and rotatably supported by a bearing hole 11a provided in the axial center of the crankshaft 11. An impeller shell 22 is connected to a face which is an opposite side to an engine 1 side of the converter cover 21 by welding, and a torque converter sleeve 23 is connected to an inner diameter side of the impeller shell 22 by welding. A first sprocket 34 is fitted to an axial outer side of the torque converter housing 41 on the outer periphery of the torque converter sleeve 23.

A pump impeller 24 is provided on an inner peripheral side of the impeller shell 22, and a turbine runner 25 is disposed on the axial engine 1 side via a stator 26. A one-way clutch OWC fixed to the stator shaft 43 is provided on the inner periphery of the stator 26.

When the engine 1 is driven, the crankshaft 11, engine drive plate 12, converter cover 21, impeller shell 22, and torque converter sleeve 23 rotate integrally. This rotation is transmitted to the input shaft 5 via the stator 26 and the turbine runner 25 by oil in the torque converter 2. Further, the first sprocket 34 to which the torque converter sleeve 23 is fitted transmits the driving force of the engine 1 to a second sprocket 32 provided on an oil pump drive shaft 31 via a chain 33, whereby the oil pump 3 is driven. In this embodiment, a speed change mechanism is omitted, but there are no particular limitations thereon, and a belt-type continuously variable transmission, a stepped automatic transmission, and so on, for example, may be employed appropriately.

Figure 2:
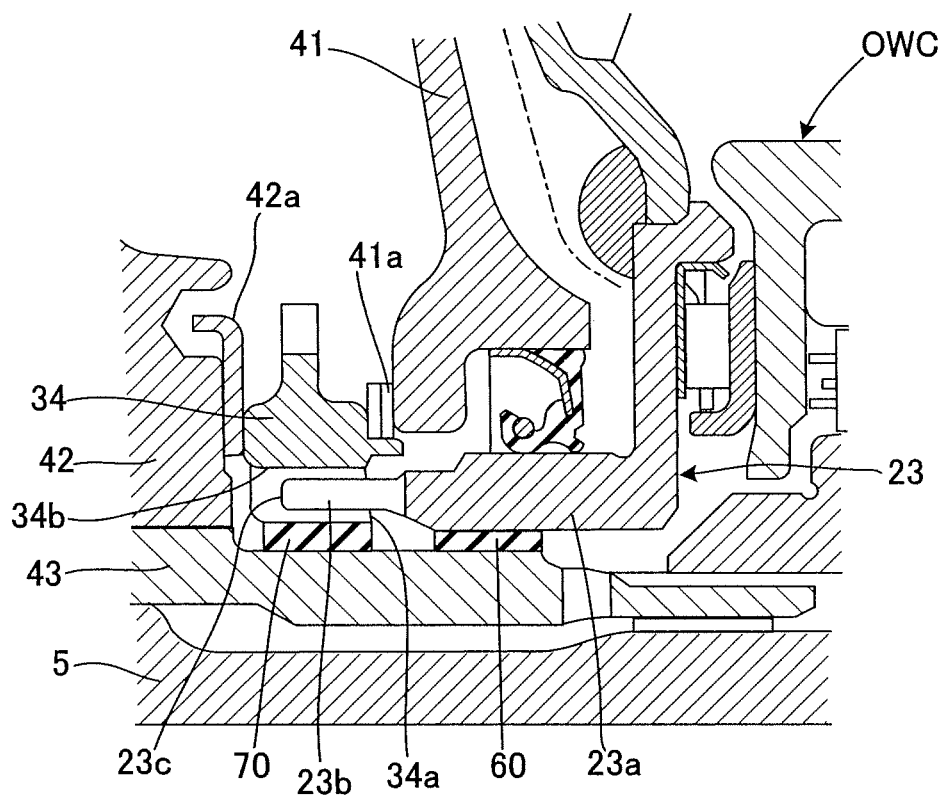
FIG. 2 is a schematic enlarged view showing the vicinity of a first sprocket and an engaging pawl according to the first embodiment of this invention.

FIG. 2 is an enlarged cross-sectional view showing a part of the torque converter sleeve 23 and the first sprocket 34. A first bush 60 is provided between the inner periphery of an axial extension member 23a of the torque converter sleeve 23 and the outer periphery of the stator shaft 43 to support the torque converter sleeve 23 rotatably. Further, a second bush 70 is provided between the first sprocket 34 and the stator shaft 43 to support the first sprocket 34 rotatably. A washer 41a is provided between the first sprocket 34 and the torque converter housing 41, and a thrust bearing 42a is provided between the first sprocket 34 and the cover 42. Thus, axial positioning of the first sprocket 34 is achieved.

Figure 3:
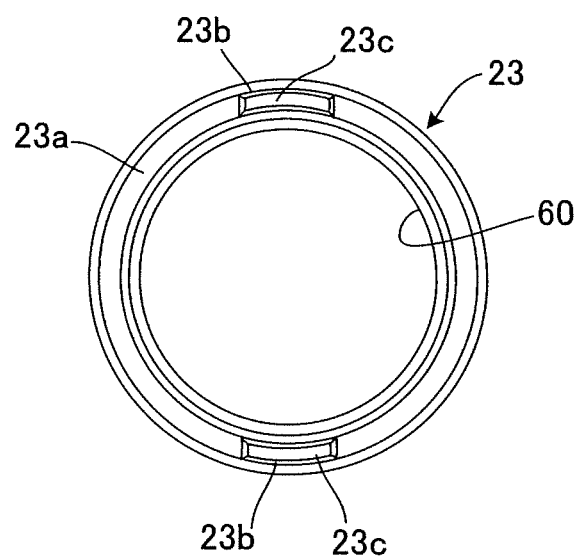
FIG. 3 is a schematic constitutional diagram showing a torque converter sleeve according to the first embodiment of this invention from a transmission side.
Figure 4:
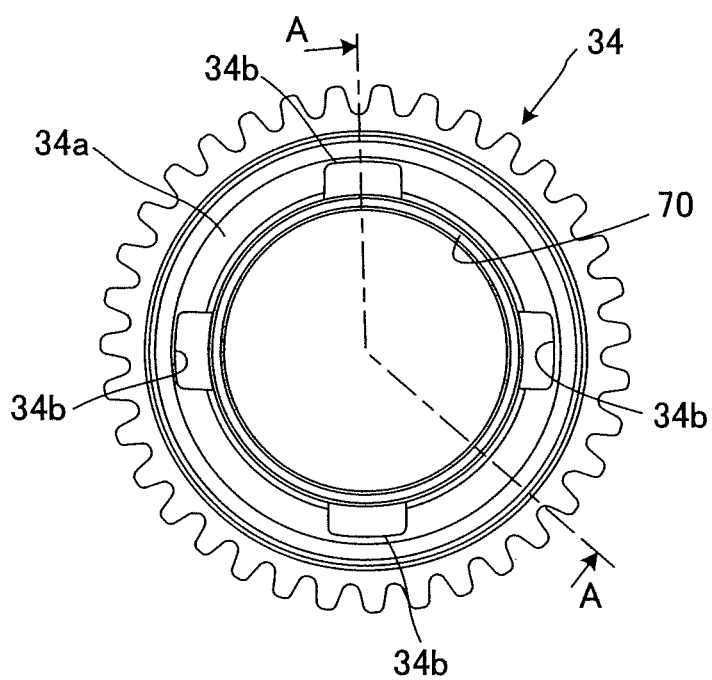
FIG. 4 is a schematic constitutional diagram showing the first sprocket according to the first embodiment of this invention from a torque converter side.
Figure 5:
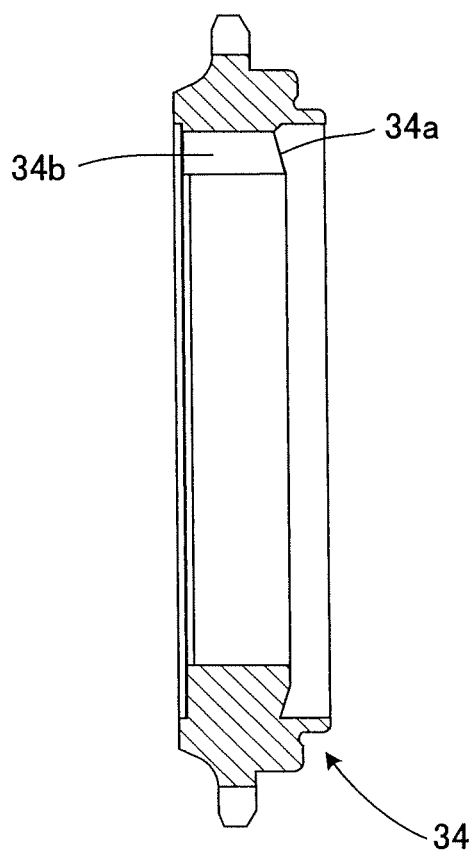
FIG. 5 is an A-A cross-sectional view of the first sprocket according to the first embodiment of this invention.

FIG. 3 is a front view of the torque converter sleeve 23 seen from an axial transmission side, FIG. 4 is a front view of the first sprocket 34 seen from the axial engine 1 side, and FIG. 5 is a cross-sectional view taken along A-A in FIG. 4.

As shown in FIG. 3, an engaging pawl 23b that extends axially is provided on an upper end and a lower end of the axial extension member 23a of the torque converter sleeve 23, and the first bush 60 is pressed into the inner peripheral side.

As shown in FIG. 4, a recessed portion 34b is provided in four locations, i.e. top, bottom, left, and right, in the inner peripheral side of the first sprocket 34 so as to penetrate axially, and the second bush 70 is pressed into the inner peripheral side.

Further, as shown in FIG. 5, a side face 34a (friction reducing mechanism) of the first sprocket 34 on the torque converter 2 side is tapered such that the axial thickness thereof increases toward a central side, or in other words such that the thickness thereof decreases radially, and the side face 34a is inclined relative to a surface 23c (to be referred to hereafter as an end face 23c) on the tip end portion of the engaging pawl 23b.

When the end face 23c of the engaging pawl 23b comes into contact with the side face 34a, friction is generated between the end face 23c and the side face 34a, and a friction torque T generated by the friction may be expressed as $$T = \mu F R \qquad \text{Equation (1)}$$

($\mu$: frictional coefficient; F: load; R: effective radius). Therefore, by tapering the side face 34a such that the axial thickness thereof increases toward the central side, the contact radius when the side face 34a and the end face 23c of the engaging pawl 23b come into contact can be reduced, enabling a reduction in friction torque and a corresponding reduction in frictional resistance.

Further, when the end face 23c of the engaging pawl 23b and the side face 34a of the first sprocket 34 come into contact, the contact between the end face 23c of the engaging pawl 23b and the side face 34a of the sprocket 34 is line contact rather than surface contact, and therefore the contact area relative to the cross-sectional area of the engaging pawl 23b can be reduced, enabling a reduction in frictional resistance.

It should be noted that although frictional resistance between the side face 34a of the first sprocket 34 and the end face 23c of the engaging pawl 23b is reduced by tapering the side face 34a in this embodiment, this invention is not limited thereto, and frictional resistance may be reduced by forming the end face 23c of the engaging pawl 23b in a tapered shape, a hemispherical shape, and so on, for example, such that the contact between the side face 34a of the first sprocket 34 and the end face 23c of the engaging pawl 23b is line contact or point contact.

The radial thickness of the engaging pawl 23b is formed to be smaller than the radial thickness of the recessed portion 34b by a predetermined gap enabling vibration to be absorbed, and by fitting the engaging pawl 23b between the second bush 70 and the recessed portion 34b in skewered state, the rotary force of the torque converter sleeve 23 is transmitted to the first sprocket 34. At this time, the magnitude of the gap between the engaging pawl 23b and the recessed portion 34b is set such that the engaging pawl 23b is detached from the inner peripheral surface of the recessed portion 34b by the predetermined gap and does not contact the recessed portion 34b directly. Thus, even if the engaging pawl 23b vibrates in the radius direction, the vibration can be prevented from being transmitted to the first sprocket 34.

Furthermore, since the recessed portion 34b is a through hole, the engaging pawl 23b, the first sprocket 34, and the second bush 70 are disposed so as to overlap at least partially in the axial direction when the engaging pawl 23b is fitted into the recessed portion 34b. It should be noted that the reason for providing four recessed portions 34b in relation to the two engaging pawls 23b is to facilitate positioning during assembly, but since there are no particular limitations on these numbers, two recessed portions 34b and four engaging pawls 23b may be provided.

Next, the actions of this embodiment will be described.

The torque converter 2 is assembled in the following order: the chain 33 and the first sprocket 34 and second sprocket 32 are assembled; the torque converter housing 41 is attached; and the torque converter 2 is attached.

When attaching the torque converter 2, (1) the input shaft 5 and a turbine 51 are spline-coupled, (2) the stator shaft 43 and the stator 26 are spline-coupled, and (3) the engaging pawls 23b are fitted into the recessed portions 34b, in that order.

When the input shaft 5 and turbine 51 are spline-coupled or when the stator shaft 43 and stator 26 are spline-coupled, fitting is performed while rotating the torque converter 2, and therefore, when the engaging pawl 23b is fitted into the recessed portion 34b, fitting is performed without fixing the positions of the engaging pawl 23b and the recessed portion 34b.

Figure 6:
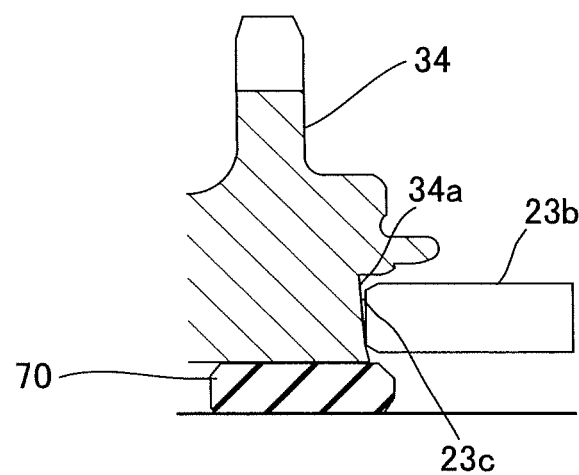
FIG. 6 is a schematic view showing a state in which the engaging pawl according to the first embodiment of this invention is fitted into a recessed portion.

Hence, when the engaging pawl 23b and the recessed portion 34b match axially, the engaging pawl 23b is inserted into and fitted to the recessed portion 34b, but when the engaging pawl 23b and the recessed portion 34b do not match axially, the end face 23c of the engaging pawl 23b comes into contact with the side face 34a of the first sprocket 34, as shown in FIG. 6.

In this case, when frictional resistance between the side face 34a and the end face 23c of the engaging pawl 23b is large, the first sprocket 34 co-rotates with the engaging pawl 23b. As a result, the relative rotation speed of the first sprocket 34 and engaging pawl 23b decreases, making it difficult to fit the engaging pawl 23b into the recessed portion 34b. Co-rotation of the first sprocket 34 and the engaging pawl 23b is particularly likely to occur when insufficient friction torque is generated to be able to fix the second sprocket 32 while the pump is non-rotational, such as when a vane pump is used as the oil pump 3, for example.

In this embodiment, frictional resistance between the side face 34a of the first sprocket 34 and the end face 23c of the engaging pawl 23b is reduced by tilting the side face 34a of the first sprocket 34 relative to the end face 23c of the engaging pawl 23b. In so doing, co-rotation of the first sprocket 34 and the engaging pawl 23b can be suppressed, and as a result, the relative rotation speed of the first sprocket 34 and the engaging pawl 23b increases. Accordingly, the engaging pawl 23b can be fitted easily into the recessed portion 34b of the first sprocket 34, enabling a large reduction in the assembly time of the torque converter 2 and an improvement in manufacturing efficiency.

It should be noted that although frictional resistance between the side face 34a of the first sprocket 34 and the engaging pawl 23b is reduced by tilting the side face 34a relative to the end face 23c of the engaging pawl 23b in this embodiment, frictional resistance may be reduced in the first embodiment by implementing any surface treatment that achieves a reduction in frictional resistance between the side face 34a and the end face 23c of the engaging pawl 23b.

The effects of the first embodiment of this invention will now be described.

In this embodiment, frictional resistance is reduced by providing the side face 34a of the first sprocket 34 on the torque converter 2 side at a tilt relative to the end face 23c of the engaging pawl 23b such that the contact area between the side face 34a and the end face 23c of the engaging pawl 23b decreases. Therefore, even if the end face 23c of the engaging pawl 23b comes into contact with the side face 34a when the engaging pawl 23b is fitted into the recessed portion 34b while rotating the engaging pawl 23b, frictional resistance between the side face 34a and the end face 23c of the engaging pawl 23b decreases. Accordingly, the relative rotation speed of the first sprocket 34 and the engaging pawl 23b increases comparatively, thereby suppressing co-rotation of the first sprocket 34 and the engaging pawl 23b and facilitating insertion and fitting of the engaging pawl 23b into the recessed portion 34b of the first sprocket 34. As a result, the assembly time can be reduced, enabling an improvement in manufacturing efficiency.

Further, by tapering the side face 34a such that the thickness thereof decreases radially, the contact radius between the end face 23c of the engaging pawl 23b and the side face 34a can be reduced, leading to a reduction in frictional resistance, and as a result, the engaging pawl 23b can be fitted into the recessed portion 34b easily, enabling a reduction in assembly time and an improvement in manufacturing efficiency.

Figure 7:
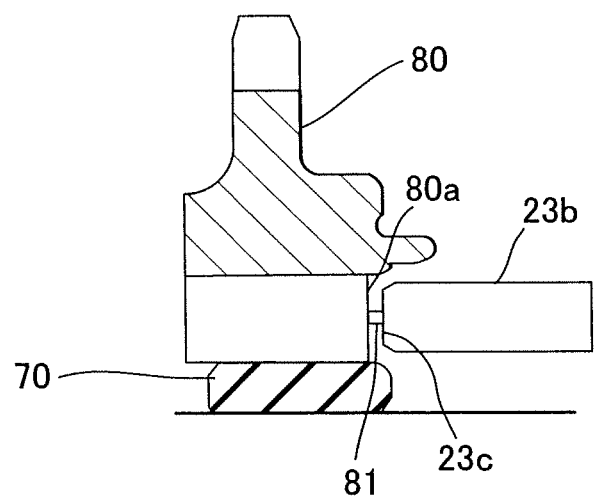
FIG. 7 is a schematic constitutional diagram of a first sprocket according to a second embodiment of this invention.

Next, a second embodiment of this invention will be described using FIG. 7. In this embodiment, the first sprocket differs from its counterpart in the first embodiment, and therefore a first sprocket 80 will be described. All other constitutions are identical to their counterparts in the first embodiment, and therefore description thereof has been omitted.

The first sprocket 80 comprises an annular projecting portion 81 that projects from a side face 80a toward the torque converter 2 side and is provided concentrically with the input shaft 5. The projecting portion 81 comes into contact with the end face 23c of the engaging pawl 23b when the torque converter 2 is attached. Thus, the contact area between the end face 23c of the engaging pawl 23b and the first sprocket 80 can be reduced, enabling a reduction in frictional resistance.

It should be noted that the projecting portion 81 may be provided on the end portion of the engaging pawl 23b. Further, frictional resistance may be reduced in the second embodiment by implementing any surface treatment that achieves a reduction in frictional resistance between the side face 80a and the projecting portion 81 and end face 23c.

The effects of the second embodiment of this invention will now be described.

In this embodiment, the annular projecting portion 81 is provided on the side face 80a of the first sprocket 80 such that when the end face 23c of the engaging pawl 23b comes into contact with the first sprocket 80 during assembly of the torque converter 2, the projecting portion 81 projecting from the first sprocket 80 comes into contact with the end face 23c. Thus, frictional resistance between the projecting portion 81 and the end face 23c can be reduced, thereby suppressing co-rotation with the first sprocket 80 and facilitating insertion and fitting of the engaging pawl 23b into the recessed portion 34b. As a result, the assembly time can be reduced, enabling an improvement in manufacturing efficiency.

This invention is not limited to the embodiments described above, and it goes without saying that the invention may be subjected to various modifications and improvements within the scope of the technical spirit thereof.

This application claims priority from Japanese Patent Application 2007-135530, filed May 22, 2007, which is incorporated herein by reference in its entirety.

What is claimed is:

1. An oil pump driving mechanism having a linking mechanism that links a first sprocket, which is linked by a chain to a second sprocket that drives an oil pump disposed in a radially detached position from a rotary shaft of a torque converter and rotates about the rotary shaft of the torque converter, and an engaging pawl of the torque converter, wherein the linking mechanism comprises:
   a recessed portion which extends axially from a side face of the first sprocket facing the torque converter and into which the engaging pawl of the torque converter is inserted; and
   a friction reducing mechanism provided on at least one of the side face and the engaging pawl,
   wherein the side face is cone-shaped and is tilted relative to an end face of the engaging pawl,
   wherein the end face and the side face are configured to contact each other at a point contact without surface contact, such that a contact area between the side and end faces is reduced, and
   wherein the first sprocket is rotated by a torque converter sleeve through the engaging pawl.

2. The oil pump driving mechanism as defined in claim 1, wherein when the friction reducing mechanism comes into contact with the side face, the contact area is smaller than a cross-sectional area of the engaging pawl.

3. The oil pump driving mechanism as defined in claim 1, wherein a thickness of the side face decreases radially.

* * * * *